United States Patent
Martin et al.

(10) Patent No.: US 9,064,429 B2
(45) Date of Patent: Jun. 23, 2015

(54) TAXIDERMY HEAD FORM AND METHOD

(75) Inventors: Roger A. Martin, Albemarle, NC (US); Brian E. Hendricks, Scottville, MI (US)

(73) Assignee: McKenzie Sports Products, LLC, Salisbury, NC (US)

( * ) Notice: Subject to any disclaimer, the term of this patent is extended or adjusted under 35 U.S.C. 154(b) by 450 days.

(21) Appl. No.: 12/884,520

(22) Filed: Sep. 17, 2010

(65) Prior Publication Data
US 2012/0070815 A1    Mar. 22, 2012

(51) Int. Cl.
*G09B 23/36* (2006.01)

(52) U.S. Cl.
CPC ........................ *G09B 23/36* (2013.01)

(58) Field of Classification Search
CPC ............ A63H 3/38; A63H 9/00; G09B 23/36
USPC ....................... 434/295–297; 428/16; 446/392
See application file for complete search history.

(56) References Cited

U.S. PATENT DOCUMENTS

| | | | |
|---|---|---|---|
| 2,831,271 A * | 4/1958 | Stitt | 434/296 |
| 3,200,515 A | 8/1965 | Daigre | |
| 3,881,272 A * | 5/1975 | Parker | 43/42.34 |
| 4,432,919 A | 2/1984 | Rinehart | |
| 4,464,440 A | 8/1984 | Dotzman | |
| 4,477,500 A * | 10/1984 | Powell | 428/16 |
| 4,775,323 A | 10/1988 | Johnson | |
| 5,015,532 A | 5/1991 | Knight | |
| 5,645,780 A * | 7/1997 | Rinehart | 264/46.4 |
| 5,735,895 A * | 4/1998 | Rinehart | 623/6.56 |
| 6,007,881 A * | 12/1999 | Lennard | 428/16 |
| 6,458,434 B1 | 10/2002 | Coombs, Jr. | |
| 6,799,974 B2 * | 10/2004 | Martin et al. | 434/295 |
| 6,884,080 B2 * | 4/2005 | Thompson | 434/295 |

OTHER PUBLICATIONS

Van Dyke's, http://www.vandykestaxidermy.com/category/forms, Jun. 15, 2010, 3 pages.

* cited by examiner

*Primary Examiner* — Gene Kim
*Assistant Examiner* — Alyssa Hylinski
(74) *Attorney, Agent, or Firm* — Nicholas C. Russell; Moore & Van Allen PLLC

(57) ABSTRACT

A taxidermy form recreates the head of an animal, the taxidermy head form comprising a head member including first and second laterally spaced protrusions molded therein for receiving and supporting artificial eyes, the eyes being movable relative to the protrusions for a desired alignment. A face member has first and second eye openings formed therethrough. The head member and the face member are dimensionally adapted to receive the other to form the assembled taxidermy head form for receiving the animal head skin. The face member is affixed in at least partially covering relation to the head member such that the at least one eye extends at least partially through the first or second eye openings.

5 Claims, 5 Drawing Sheets

US 9,064,429 B2

TAXIDERMY HEAD FORM AND METHOD

BACKGROUND

This invention relates to taxidermy forms and mannequins, and more particularly to a taxidermy form assembly including a head member and a separate face member.

Taxidermy involves the preservation of animal skins and mounting the animal head skins over molded animal head mannequins which replicate the sub-dermal structures of the animal to be preserved. In addition to the skin, the taxidermist will further attach artificial eyes, noses, antlers, and the like, to the mannequin to further replicate the true appearance. The end product is secured to a wall plaque or the like, and typically mounted on a wall as a trophy.

Conventional taxidermy head form mannequins provide pre-formed eye socket cavities into each of which the taxidermist must mount separate artificial glass eyepieces. When modeling a taxidermy form, the eyes must be set within the eye sockets in a precise manner at the proper depth and angle. To allow for tilting of eyes relative to the sockets, the eye sockets are made relatively deep, and the eyes are then embedded in a layer of modeling clay, two-part epoxy or other malleable material. The taxidermist may use the same clay or epoxy in the eye and nose areas to sculpt, for example, a more detailed anatomically correct eyelid area over the eye to recreate the proper eyelid and muscle definition. A layer of hide paste is then applied to the surface of the mannequin. The head skin of the animal is then pulled over the form with the eye set in, seams are sewn and left to dry.

A taxidermist spends considerable time and skill to properly adjust the depth and alignment of the eyes. If the taxidermist does not apply the correct thickness of clay, the eyes may appear sunken or protruding. It is also important to align the angle of the eye, and particularly the pupil, in relation to the form so that the eye appears to be symmetrical and as natural as possible. Some animals, for example, a cat, have vertical elongated pupils, whereas other animals, for example, a deer, have horizontal elongated pupils and other animals, for example, a bear, have round pupils. If the eye is of the elongated pupil type, there are a number of axes on which the eye must be properly aligned for it to appear lifelike and to constitute a correct anatomical representation of an animal. In addition, the eyes of different animals are naturally set at different angles with regard to the "straight ahead" direction. For example, a dog's eyes are at almost 0° to straight ahead, whereas some bird species have their eyes at almost 90° to straight ahead. A white-tailed deer's eyes are at approximately 45° to straight ahead. Moreover, there are variations in shape and size of the eyes, even for different sized animals of the same species.

The taxidermy head forms may lack detail in particular facial contour features due to the difficulties in molding the areas around the eyes, eyelids, nose, nostrils, septa, and lips. The forming of the correct eye-surrounding anatomical contour features is demanding of considerable time and skill of the taxidermist. In the past, there have been problems correctly positioning and securing of the skin in the correct anatomical position over the eyelid and eyebrow portions and around the lips and nose. Nose and lip models are available as discrete components, to be attached separately to the taxidermy form. However, the taxidermist still must affix the nose and the lips parts to the head model and to dimensionally match the artificial parts to the skin, in order to obtain a life-like taxidermy model.

For the foregoing reasons there is a need for a taxidermy animal head mannequin which allows the eyes to be easily and accurately positioned therein in correct position and rotational orientation. The new mannequin should also have correct and detailed facial and eye-surrounding anatomical features as an integral part of the mannequin, especially in the area of the eyes and lips.

SUMMARY

A taxidermy form is provided for mounting a preserved animal skin for recreating the head of an animal. The taxidermy head form comprises a head member having a lower jaw including a lip skin conforming section, a chin and an exterior surface to resemble the shape of the head of the animal. The head member including first and second laterally spaced protrusions molded therein for receiving and supporting artificial eyes, the eyes being movable relative to the protrusions for a desired alignment. A face member has an upper jaw including lip skin conforming section, and first and second eye openings formed therethrough. The face member is formed to resemble the sub-dermal muscular structure and facial anatomical features of the animal. The head member and the face member are dimensionally adapted to receive the other to form the assembled taxidermy head form for receiving the animal head skin. The face member is affixed in at least partially covering relation to the head member such that the at least one eye extends at least partially through the first or second eye openings.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

Figure 1:
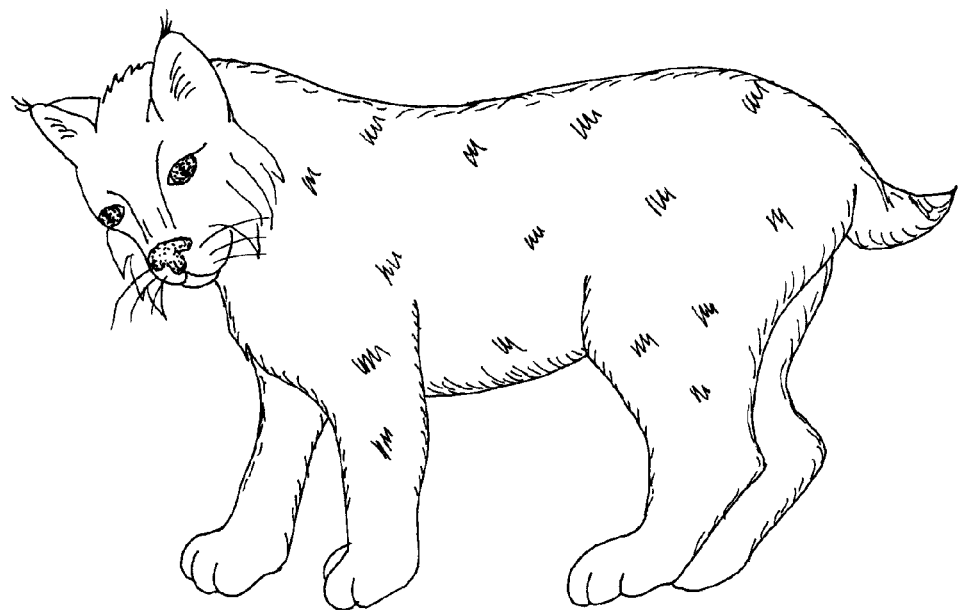
FIG. 1 is a perspective view of a bobcat.
Figure 2:
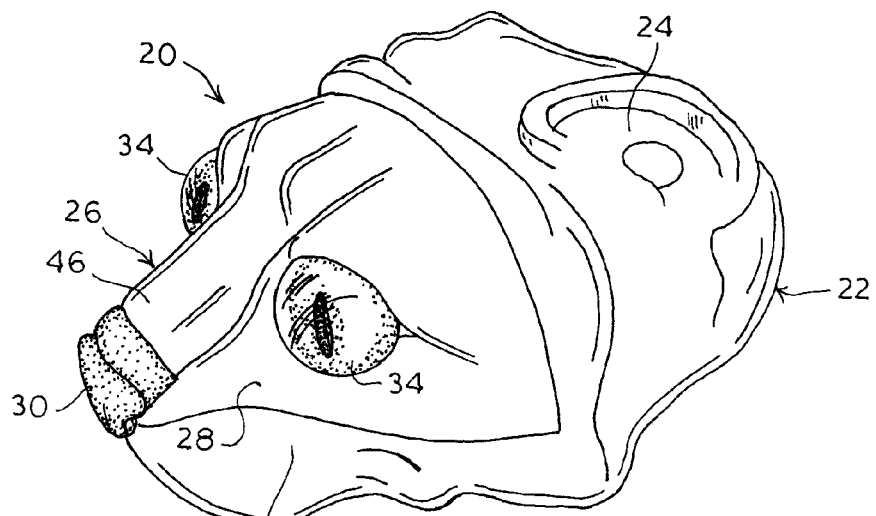
FIG. 2 is a perspective view of an embodiment of a taxidermy form for a bobcat head.
Figure 3:
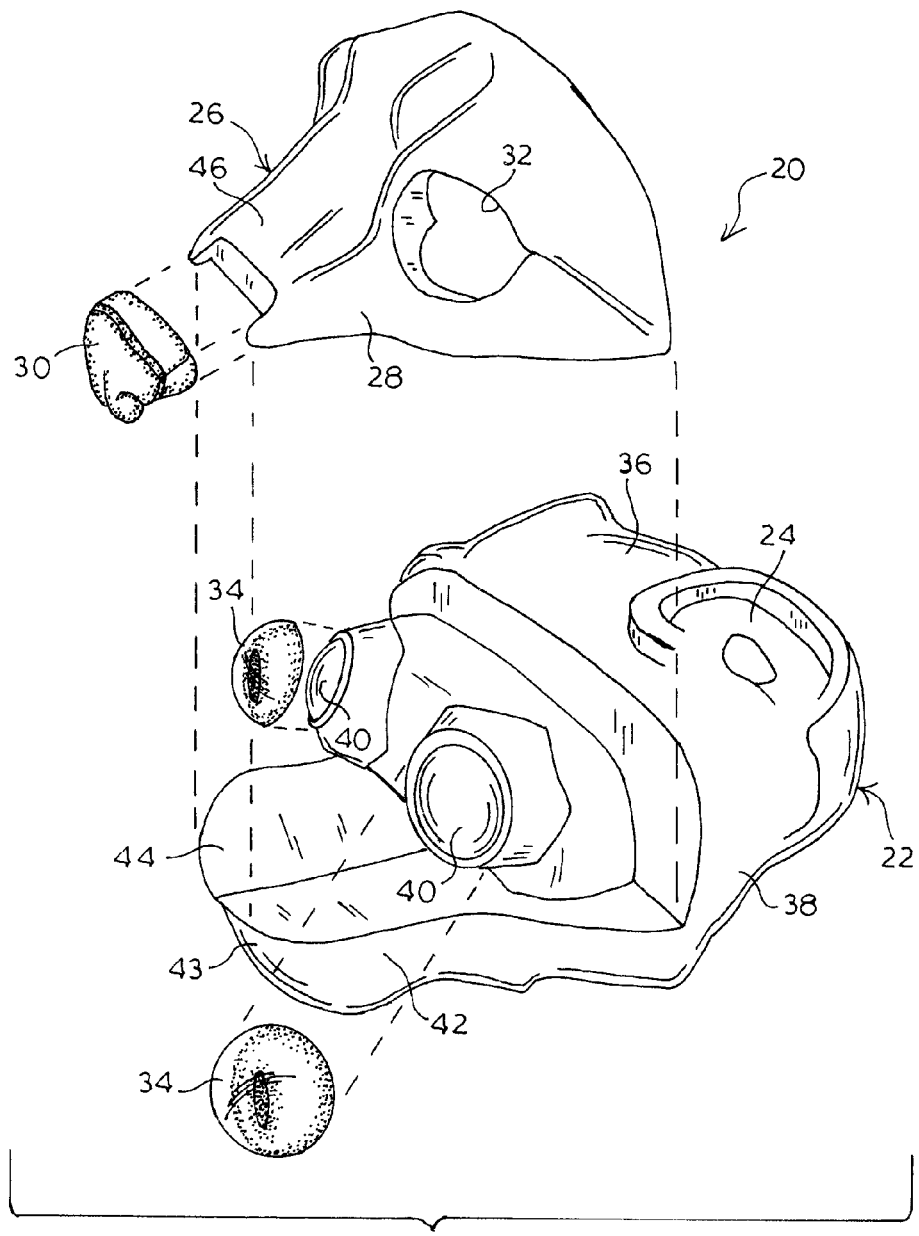
FIG. 3 is an exploded perspective view of the taxidermy form as shown in FIG. 2.
Figure 4:
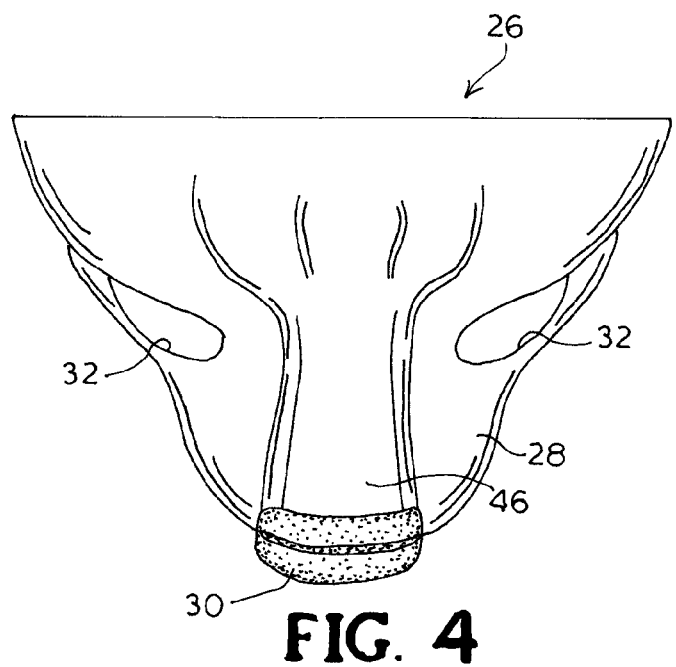
FIG. 4 is a top plan view of an embodiment of a face member of a taxidermy form as shown in FIG. 2.
Figure 5:
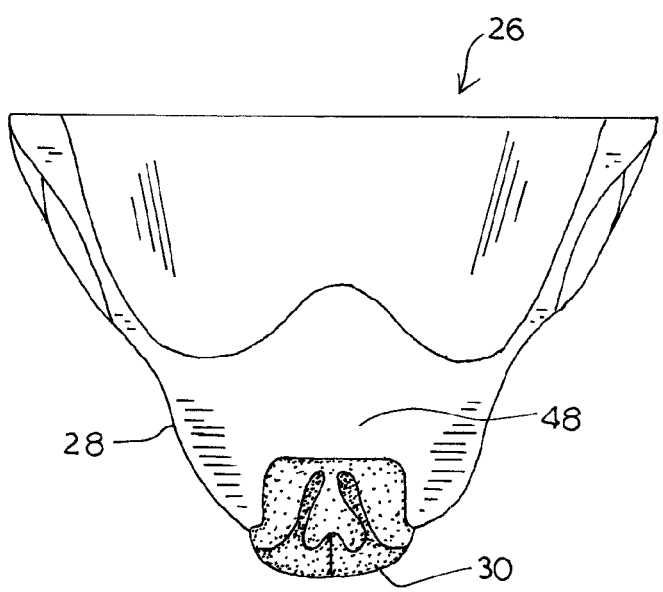
FIG. 5 is a bottom plan view of the face member of a taxidermy form as shown in FIG. 4.
Figure 6:
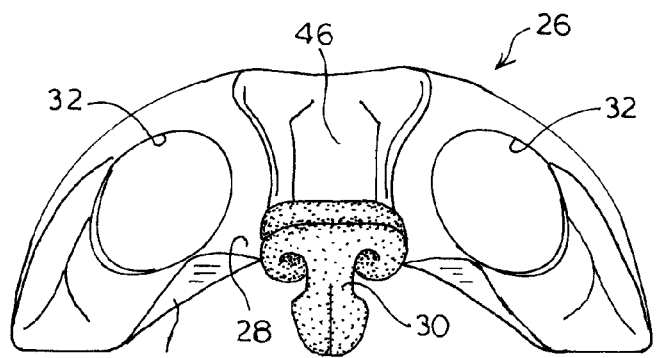
FIG. 6 is a front elevation view of the face member of a taxidermy form as shown in FIG. 4.
Figure 7:
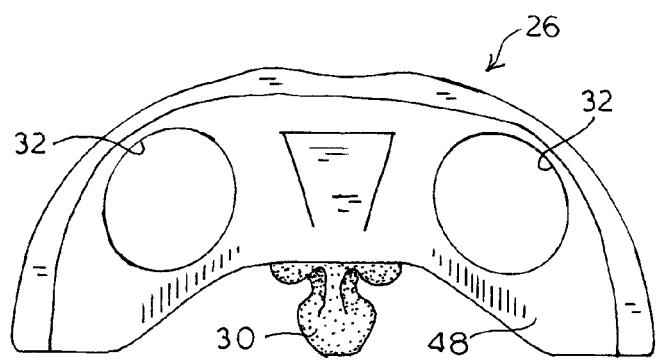
FIG. 7 is a back elevation view of the face member of a taxidermy form as shown in FIG. 4.
Figure 8:
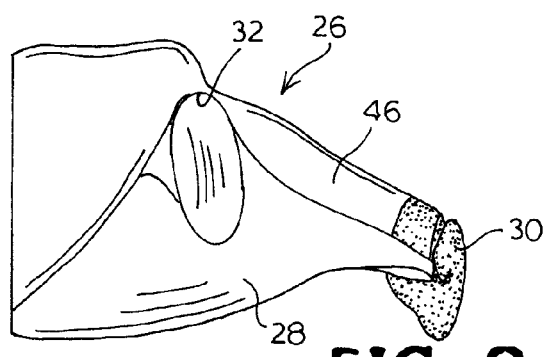
FIG. 8 is a right side elevation view of the face member of a taxidermy form as shown in FIG. 4, the left side elevation view being a mirror image.

Referring now to the drawings, wherein like reference numerals designate corresponding or similar elements throughout the several views, FIG. 1 shows a bobcat. FIGS. 2 and 3 show an embodiment of an animal taxidermy head form mannequin having the anatomical features of a bobcat head, and generally designated at 20. The taxidermy form comprises a mannequin head member 22, including ear mounting surfaces 24, and a face member 26 comprising an upper jaw 28 for receiving an upper lip and a nose and a pair of anatomically correct eye socket openings 32 formed therethrough. The taxidermy form 20 further comprises a pair of artificial eyes 34 and an artificial nose 30 piece having simulated nostril openings.

Referring to FIG. 3, the head member 22 includes a cranial portion 36, a base portion 38, first and second eye protrusions 40, and a lower jaw portion 42 including a lip conforming upper edge section. The first and second eye protrusions 40 are hemispherical in shape and are positioned and oriented on the taxidermy form 20 so that when the eyes 34 are placed on the protrusions 40 and secured thereto, the eyes project the image of the animal eyes. The lower jaw portion 42 forms a chin 43, and the interior edges of the lower jaw portion and the upper portion of the chin are molded to resemble lower jaw lips. The upper surface 44 of the head member 22 is dimensionally adapted to receive the face member 26 to form a complete head or skull assembly.

Referring to FIGS. 4-8, the face member 26 comprises a distal snout portion or nostril septum 46, the upper jaw 28 including a lip conforming lower edge section. The proximal end of the face member has the first and second eye openings 32 formed therethrough. The outer surface of the face member 26 may be contoured to reproduce the muscular structure and facial features and characteristics of the particular animal species to be sculpted, especially the detail in the anatomical features immediately surrounding the eyes. For example, the outer edges of the eye openings 32 are molded to simulate eyelids and are positioned to allow the artificial eyes 34 to extend partially therethrough when the face member 26 is are adhered to the head member 22. The inner surface 48 of the face member 26 is smooth and adapted for attachment to the head member 22 in a covering relationship. As seen in FIG. 2, when the face member 26 is attached to the head member 22 in an overlying relationship, the eyes 34 extend partially through the eye openings 32 in the face member 26.

The taxidermy head form 20 is molded from any desired material, for example a light-weight polyurethane foam material, or any other moldable and easily carved or shaped material known in the art. The taxidermy form 20 can be made using a mold using molding techniques well known to those of ordinary skill in the art. Mold parts comprise interior walls defining an anatomically correct internal shape for forming the taxidermy head form 20. The taxidermy form is made by introducing hardenable polyurethane liquid foam into a cavity formed by the mold parts when placed together. The polyurethane is allowed to foam, expand and harden to form the taxidermy head form mannequin 20 in a conventional manner. After the polyurethane foam hardens, the mold parts are opened and the taxidermy head form is removed. The taxidermist may then use the taxidermy head form mannequin to prepare a realistic mount by mounting an animal skin over the mannequin.

In the embodiment shown in the FIGs., the artificial nosepiece 30, including nostril cavities, is secured to the distal end of the nostril septum 46 using adhesive, such as hot glue or an epoxy material. A taxidermist may further detail the prepared nosepiece by painting or other detailing as desired while entirely exposed prior to being affixed to the face member 26. Alternatively, the nosepiece 30 may be molded together with the face member 26. In the latter embodiment, a step for the taxidermist in the preparation of the taxidermy head form is eliminated.

Figure 9:
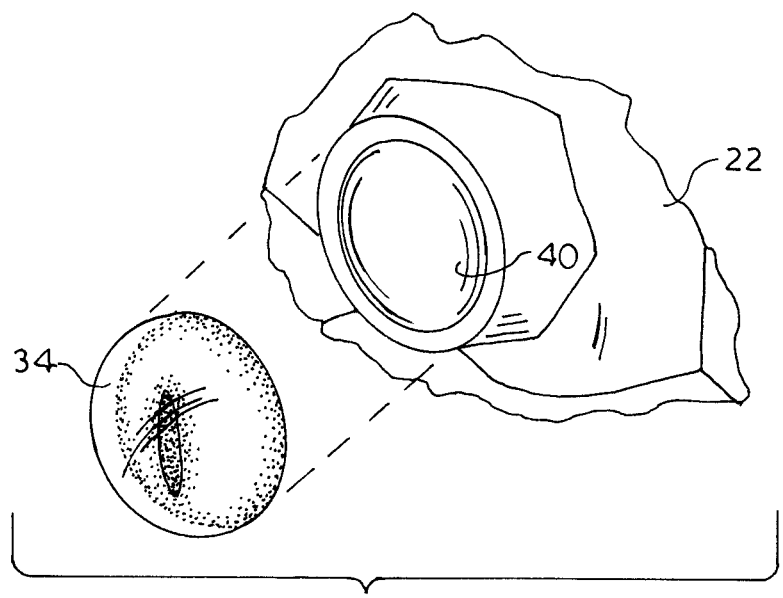
FIG. 9 is an a close-up perspective view an embodiment of a left eye and a cut-away of a head member of a taxidermy form as shown in FIG. 3.
Figure 10:
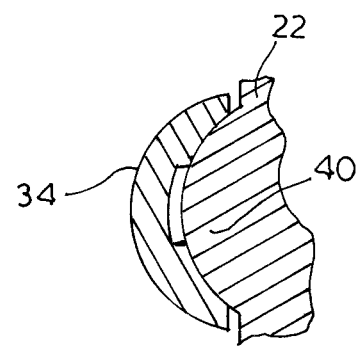
FIG. 10 is a cross-section view an eye in place on a cut-away portion of an embodiment of a taxidermy form.

Referring to FIGS. 9 and 10, the artificial eyes 34 comprise a semi-spherical concentric body having an outer convex surface and an inner concave surface. When positioning the eyes 34 onto the protrusions 40 and rotationally aligning the eyes, adhesive is used as a bonding agent. The adhesive is applied to the surface of each of the eye protrusions 40 on the head member 22 and an eye 34 is placed on each of the protrusions 40. The adhesive may be a soft clay or epoxy that allows easy adjustment of the alignment of the eye 34 at first, but slowly sets hard to fix the eye 34 in place. As best in FIG. 10, the shape of the protrusions 40 generally correspond to the inner concave surface of the eyes 34, such that the eyes receive the front, spherical portion of the protrusions.

In practice, the taxidermist initially adjusts the eyes 34 relative to the protrusions 40 so that the pupils of the two mated eyes 34 appear straight and symmetrical as seen from a viewpoint in front of the head form mannequin 20. The alignment can be done by the taxidermist using both hands, without leaving the observing position in front of the mannequin. The shape of the protrusions 40 serves to facilitate rotation and positioning of the eyes 34 relative to the protrusions 40. This allows the taxidermist to position the eyes 34 into the proper anatomical position for correct directional orientation of the pupil of each eye. When the eyes 34 are positioned properly, elongated pupils, for example, will be properly aligned anatomically, and the eyes 34 will be correctly located in relationship with the other features of the taxidermy form 20. Adjusting alignment of the eyes 34 may include packing additional clay or other material under the edges of an eye. Alternatively, the eyes 34 may be on a mechanical mount that can be tightened to lock the eyes 34 in place.

With the eyes 34 properly positioned and adhered to the protrusions 40 on the head member 22, the face member 26 is then fixed to head member 22. The shape and dimensions of the inner surface 48 of the face member 26 corresponds with the shape and dimensions of the upper surface 44 of the head member 22. A layer of adhesive is applied to the surfaces 44, 48 of the head member 22 and the face member 26, and the face member 26 is attached in a covering relation to head member 22. The eye openings 32 in the face member 26 are adapted to receive the eyes 34 when the face member 26 is attached. As seen in FIG. 2, the taxidermy form 20 is complete when the face member 26 is attached to the head member 22 with the eyes 34 extending partially through the eye openings 32.

Once the taxidermy head form 20 is assembled, the skin (not shown) of the preserved animal may be positioned over the taxidermy form and attached thereto. The skin is adhered to the interior edges of the upper jaw portion 28, as well as around the periphery of the nose 30 and eye openings 32 and over the eyelid and eyebrow portion areas. Similarly, the skin can be adhered to the chin 43 and the interior edges of the lower jaw portion 42. Skin material extending beyond the upper and lower jaw portions 28, 42 may be tucked between the inner surfaces of the head member 22 and face member 26. Alternatively, a mechanical attachment (e.g., screws) could be used to assemble the mouth assembly to the mannequin head. Usually the end of the neck section (not shown) of the taxidermy form is secured to a wall plaque wherein the head is to be displayed as a trophy. An entire skin may also be mounted over preformed body and legs in a manner well understood in the art.

The embodiments of the taxidermy head form mannequin 20 described herein have many advantages, including providing an improved apparatus and method for taxidermists to set artificial eyes into a taxidermy head form. Specifically, the taxidermist can more easily set the depth and orientation between mated artificial eyes. Establishing a consistent depth allows the taxidermist to focus on the rotation of the eyes. Using protrusions 40 for receiving the artificial eyes on a separate head member accelerates the process of setting the eye positions, which is made more accurate and more symmetrical. The protrusions 40 serve to automatically and consistently establish a correct anatomical eye depth, and at the same time serve as reference indicia used to align the eyes on the protrusions into proper alignment. Since the protrusion is integrally formed on the head portion in the correct anatomical orientation with respect to the other mannequin features, the taxidermist need only be concerned with positioning the angle of the eye relative to the animal head mannequin in proper anatomical position, thus facilitating rapid and accurate creation of a realistic taxidermy mount. The taxidermist may select different positions of the eyes, such selection now readily implemented by using the protrusions 40. As a result, both eyes are correctly oriented in their respective sockets and symmetrically balanced in all areas in orientation and with each other. Moreover, such realistic results may be consistently achieved, as compared with known conventional techniques.

The use of a separate face piece allows creation of realistic anatomical features in the area surrounding the eyes so the taxidermist need not spend time and skill filling in and contouring around the eyes to provide correct anatomical eye-surrounding features. It also allows the animal skin to be fitted around the eye openings, nose and lips for a natural appearance.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, it is apparent that taxidermy mannequins of many other species, including a fish form, other types of sculptures such as artistic sculptures, clothing mannequins, dolls, toys, etc., may also be made in accordance and will be enhanced by the use of the described embodiments and are encompassed herein. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A taxidermy form for mounting a preserved animal skin for recreating the head of an animal, the taxidermy head form comprising:
    a head member having a lower jaw including a lip skin conforming section, a chin and an exterior surface to resemble the shape of the head of the animal such that the head member defines a first portion of a skeletal structure of the animal, the head member including first and second laterally spaced protrusions molded therein for receiving and supporting artificial eyes, wherein at least a portion of the protrusions are hemispherical in shape;
    at least one artificial eye comprising a singular hemispherical body having an outer convex surface and an inner concave surface, wherein the hemispherical portion of the protrusions correspond to the inner concave surface of the at least one artificial eye such that the at least one artificial eye is configured to receive the hemispherical portion of the protrusions and the at least one artificial eye is movable relative to the hemispherical portion of the protrusions for a desired multidimensional alignment; and
    a face member having an upper jaw including a lip skin conforming section, and having first and second eye openings formed therethrough, the face member formed to resemble a second portion of the skeletal structure, a sub-dermal muscular structure and facial anatomical features of the animal,
    wherein the head member includes a recess in which the face member is dimensionally adapted to be received to form the assembled taxidermy head form for receiving the animal skin and wherein the face member is affixed in at least partially covering relation to the head member such that the at least one eye extends at least partially through the first or second eye opening.

2. The taxidermy head form as recited in claim 1, wherein first and second artificial eyes are positioned on the protrusions.

3. The taxidermy head form as recited in claim 1, wherein the head member and the face member are molded rigid members of foamed polyurethane.

4. The taxidermy head form as recited in claim 1, further comprising a nose for attachment to the face member.

5. The taxidermy head form as recited in claim 1, wherein the protrusions are semi-spherical.

* * * * *